March 22, 1966 F. A. SMALTO 3,242,350

SHIFT REGISTER

Filed Dec. 29, 1961 2 Sheets-Sheet 1

INVENTOR
FRANK A. SMALTO

BY William N. Barret Jr.
ATTORNEY

March 22, 1966 F. A. SMALTO 3,242,350

SHIFT REGISTER

Filed Dec. 29, 1961 2 Sheets-Sheet 2

3,242,350
SHIFT REGISTER

Frank A. Smalto, Endicott, N.Y., assignor to International Business Machines Corporation, New York, N.Y., a corporation of New York Filed Dec. 29, 1961, Ser. No. 163,105
4 Claims. (Cl. 307—88.5)

Figures 1A, 2:
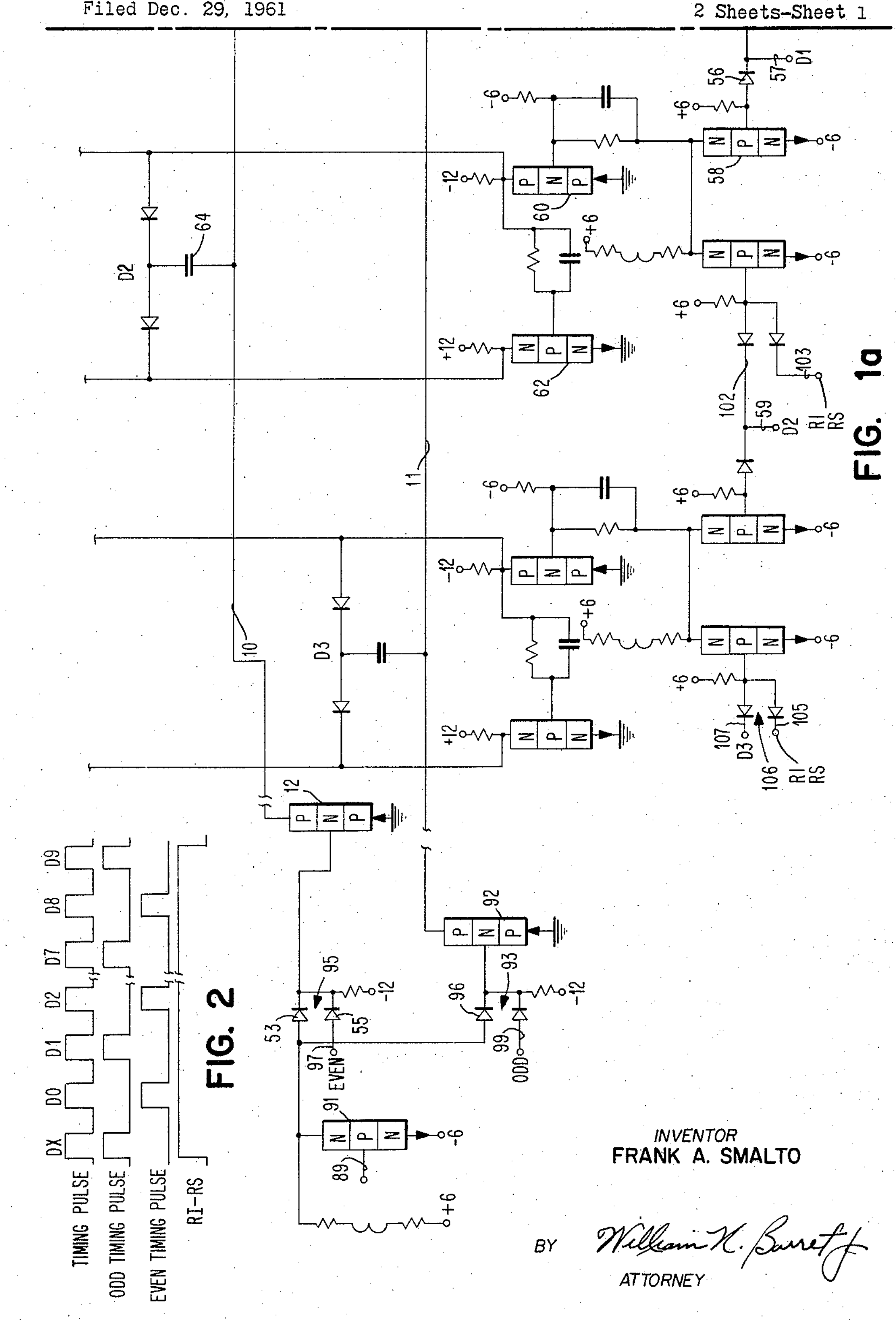

The present invention relates to a shift register and in particular to a shift register using a serial by digit shift.

As is well known in the art, a shift register is a storage device for the digits of a number wherein the digits may be shifted from one order of magnitude to the next order of magnitude with suitable controls. Each order of the shift register or stage usually contains at least one bistable device of some type; core, bistable multivibrator, relay, capacitor, etc. The number of elements will, of course, depend on whether the number is binary, radix two or decimal, coded in a 2/5 representation, etc. These stages may be linked together by various logic circuitry to enable the digit contained in one stage to be shifted to the stage immediately adjacent thereto.

The present invention is an improvement over known shift registers in providing great flexibility in the performance of various operations. This is accomplished broadly by associating every other stage in the shift register with a separate input-output connection, whereby adjacent stages or stages of the other series may be simultaneously controlled.

It is therefore an object of the present invention to provide an improved shift register.

It is a further object of the present invention to provide a serially operated shift register whereby control may be made on a plurality of stages without interference.

Another object of the present invention is to provide a shift register having a high speed operation without undue expense or complexity.

The foregoing and other objects, features and advantages of the invention will be apparent from the following more particular description of a preferred embodiment of the invention, as illustrated in the accompanying drawings.

Figure 1B:
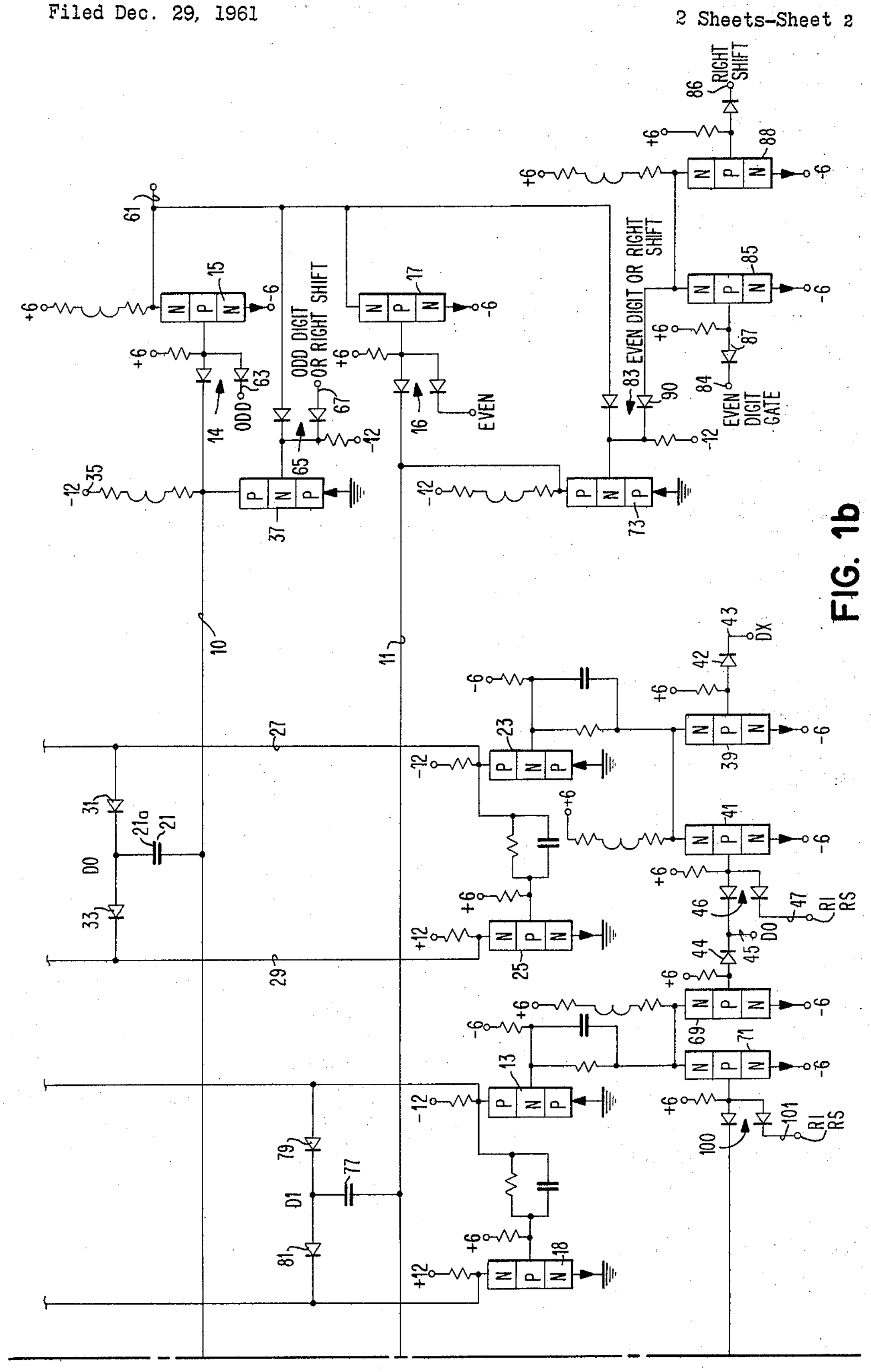

In the drawings:

FIG. 1, consisting of FIGS. 1*a* and 1*b*, is a detailed circuit of the invention.

FIG. 2 is a timing pulse chart of FIG. 1.

The present invention utilizes a capacitor as a storage device for each bit position. Each digit position of the shift register will contain the number of bit positions which are required to represent a number. For example, in a 2/5 code wherein the bit positions are weighted decimally, the weights are 0, 1, 2, 3, and 6. For a number such as "1," a bit would be present at the "0" and "1" bit positions; for a "9," bits would be present at the "3" and "6" bit positions.

In the drawings, FIGS. 1*a* and 1*b*, there is shown a shift register with only a single bit position for each digit position. The digit positions of the shift register are indicated as D0, D1, D2, and D3 for the embodiment shown. It is obvious, of course, that the number of digit positions will depend on intended usage. It should also be noted that the showing of one bit position is illustrative and is for simplification in representation only. There would necessarily be as many bit positions as necessary for the code being used.

In considering the operation of the shift register, it will be noted that a bit position of like weight, i.e., representing the same weighted position in the code in the even digit positions D0, D2, D4, etc., is associated with an input-output 10, while in the odd bit positions D1, D3, D5, etc., the input-output is 11. In other bit positions of like weight, there will also be two input-outputs—the odd and even digit positions.

The storage device used in the present invention consists of a capacitor, such as 21, FIG. 1*b*, and diodes 31 and 33. Controlling the readin and readout of information from this bit position and all other bit positions of the same digit position D0 are transistors 25 and 23, FIG. 1*b*.

In the present storage arrangement, a charge of −12 volts relative to the plate 21*a* is considered to represent the presence of a bit while a voltage of 0 volts relative to plate 21*a* is considered to represent the absence of a bit. The input-output 10, and similarly input-output 11, is maintained generally at −12 volts as shown, for example, by the supply 35, FIG. 1*b*.

If the capacitor 21 is storing a bit, i.e., −12 volts and the digit position D0 is read out, the transistor 23 will conduct by means to be explained subsequently and raise the voltage at its collector to ground potential. This positive excursion of voltage will raise the voltage at the plate 21*a* of capacitor 21 to zero volts and a 12 volt excursion will be reflected across capacitor 21 to raise the voltage on the line to zero volts. This raises the voltage at AND circuit 14 and with an ODD pulse at terminal 63, the transistor 15 will conduct and apply a negative pulse to OR circuit 65 to allow the −12 volt bias to a transistor 37 to become effective. The transistor 37 will conduct and clamp the input-output 10 at ground potential. By virtue of the loop through AND circuit 14, the input-output 10 will stay at zero volts so long as an ODD pulse is present at terminal 63. When the ODD pulse terminates, the output line drops to −12 volts, and the negative excursion is reflected across capacitor 21 to restore the voltage relative to plate 21*a* to −12 volts. The transistor 23 will be cut off by the termination of the same ODD pulse.

If the capacitor 21 has no bit stored thereon, i.e., 0 volts relative to plate 21*a*, the conduction of transistor 23 will not effect the charge since the capacitor 21 already has a zero volt potential which is the same as that applied by transistor 23.

On readin of information to capacitor storage, the line 10 is raised to zero volts. If the potential relative to plate 21*a* is zero volts, no bit stored, the reflection of voltage change will raise the voltage above zero volts. However, any charge greater than zero volts on plate 21*a* will be dissipated through diode 33 to and through transistor 25 which is conducting in response to conduction in transistor 23. When the voltage again drops to −12 volts, the reflected change will drop the potential at plate 21*a* to −12 volts to indicate a bit.

For other bit positions in other digit positions, the capacitors will be in effect open circuits, and no change will be made in charge.

Before describing the circuit per se, the timing arrangement used in the present invention should be particularly noted since it forms the key to the manner of operation of the invention. In FIG. 2, a series of timing pulses DX, D0, D1, D2, etc., are shown. These are a time series of pulses and thus DX occurs and terminates, and then pulse D0 appears, etc. Two other series of pulses are used, and these are the ODD and EVEN pulses which refer to DX, D1, D3, etc., and D0, D2, D4, etc.

Referring to FIG. 1*a*, it will be noted that even bits of data are applied at terminal 97, and odd bits of data are applied to terminal 99. Thus the even data bits are associated with the input-output 10, and the odd data bits are associated with the input-output 11. It should be noted here that there would be similar circuitry to that shown connected to input-outputs 10 and 11 for each bit position.

As will be noted, the input-output 10 is associated with digit positions D0, D2, D4, etc., while the input-output 11 is associated with digit positions D1, D3, etc.

In a readin of information to the shift register, a bit is entered into the storage units in the following manner: The input 89 of transistor 91 is raised, and the transistor 91 conducts and drops the potential applied to diodes 53 and 96 of the negative AND circuits 95 and 93. The transistors 12 and 92 are normally maintained nonconducting by the supply voltage of transistor 91. However, when this voltage is dropped to a negative value and a negative signal is present on terminals 97 or 99 indicative of the presence of a bit to be read in, the transistor is no longer biased to nonconduction and will conduct and raise the output at its collector. Thus for even digits D0, D2, etc., the entry of a bit is accomplished by raising the voltage on input-output 10 to zero volts and for odd digit positions by raising input-output 11 to zero volts.

At the same time, a readin pulse, R1–RS, FIG. 2, is applied to AND circuits 46, 100, FIG. 1*b*, and 102, 106, FIG. 1*a*. These AND circuits would of course be present for each digit position. For example, if there is a bit to be entered into digit position D0, capacitor storage 21, the AND circuit 46 would be conditioned by a readin pulse on input 47 and a D0 timing pulse on line 45. This coincidence of pulses raises the potential of the base of transistor 41 and biases the same to conduction, thereby dropping the collector voltage.

It should be noted that the D0 pulse also raises the potential of the base to transistor 69 and causes conduction therein to condition the D1 storage element 77. At this time, even timing pulse, there is no input at 99, FIG. 1*a*, and thus the charge is restored to capacitor 77, if any, by output circuits to be described subsequently.

As the transistor 41 collector voltage drops to −6 volts, the transistor 23 is biased to conduction and in turn biases the transistor 25 to conduction. If a bit is to be entered into capacitor 21, the voltage of the input-output 10 is at a raised level, and the storage of a −12 volt charge occurs as described previously when the input-output 10 is dropped to −12 volts.

If a bit was to be entered into storage capacitor 77, an AND circuit 100, FIG. 1*b*, would be enabled by the readin pulse at input 101, FIG. 1*b*, and the D1 timing pulse at input 57, FIG. 1*a*.

For a readout of information from each digit position of the register, the timing pulses alone are used. Consider the timing pulse DX, which is applied to the cathode of diode 42, FIG. 1*b*. When the pulse rises, the transistor 39 will conduct by reason of the positive bias, and its collector voltage will drop to −6 volts. This voltage is applied to transistor 23 which initiates the readout of all capacitors of digit position D0, as explained previously.

The input-output 10 and others associated with other bit positions is either raised in voltage to indicate a bit or remains at the potential of −12 volts, the magnitude of the supply 35. In the case of no readout, nothing further occurs. However, if the input-output 10 rises to zero volts, the AND circuit 14 will be enabled by the coincidence of the ODD timing pulses at input 63. The transistor 15 will conduct and drop the voltage at output 61 to indicate the presence of a bit at D0. In this respect it should be noted that all digit positions are read early, i.e., read by a timing pulse which occurs prior to the time in which they are ordinarily enabled.

The lowered voltage at 61 is applied to a negative AND circuit 65 which with a negative pulse indicative of an ODD digit pulse (note that this is not the positive timing signal but an inverted timing signal) allows the output of AND circuit 65 to drop to a negative value. The transistor 37 therefore conducts and clamps the input-output 10 to ground potential. At the termination of the ODD pulse, the transistor 37 again becomes nonconducting, and the input-output 10 goes to −12 volts to restore the charge on capacitor 21.

For the next digit position D1, the D0 pulse by biasing diode 44, FIG. 1*b*, allows transistor 69 to conduct and drop the collector voltage. The transistor 13 is then biased to conduction, and as explained previously, the input-output 11 reflects the charge on capacitor 77. In this case the AND circuit 16 is enabled, the output 61 indicates the condition of capacitor 77 and the voltage applied to AND 83 to operate transistor 73, if necessary. The other input to AND 83 is seen in this case to be a negative signal. An EVEN digit gate at 84 allows the transistor 85 to conduct and drop its collector voltage while a right shift gate at 86 allows transistor 88 to perform the same function.

In a shifting operation the significant timing signals are the right shift signal applied to AND circuits 46, 100, 102 and 106 as in a readin operation and to the AND circuits 65 and 83, FIG. 1*b*. The timing signals D0, D1, D2, etc., enable these gates successively and as in a readin operation also condition the next higher order digit position. Thus, for example, a D0 pulse conditions AND circuit 46 to readout the D0 capacitor storages, such as 21 and also by means of diode 44, transistor 69 reads out the D1 capacitor storages, such as 77.

In the readin of data, it will be remembered that the readout of the next higher digit position was ineffective to perform any function. In a shift operation, however, the following additional controls are exercised. If the AND circuit 46 is conditioned by a D0 signal at input 47, the transistor 41 will be biased to conduction to operate transistors 23 and 25 to read out the capacitors of the D0 digit position. At the same time the transistor 69 is biased to conduction by reverse biasing diode 44 and transistors 13 and 15 are biased to conduction to read out the charge on capacitors, such as 77 of the D1 digit position.

The AND circuit 14, connected to input-output 10 is not conditioned since an ODD signal is required at input 63 and D0 is an EVEN signal. The even AND circuit 16 is however conditioned to operate transistor 17 to conduction in the presence of a bit and to perform the clamping operation by enabling AND circuit 83. This it will be remembered biases transistor 85, FIG. 1*b*, to conduction and holds input-output 11 at the proper voltage for a bit indication. Further the AND circuit 65 will be enabled if transistor 17 conducts since there is a right shift signal at input 67, FIG. 1*b*. Thus if there is a bit or bits present in the D1 stage and particularly capacitor 77, the transistor 37 will be biased to conduction and upon termination of the even pulse D0 will charge capacitors connected with digit position D0, only 21 shown, to the proper charge to indicate this bit.

In summary therefore, the charge patterns in D0 are ignored, and the charge patterns of D1 shifted to the D0 position.

For the next digit shift, a timing signal D1 is applied at input 57, FIG. 1*a*, to the AND circuit 100 and also to the cathode of diode 56. At this time the transistor 71 is biased to conduction which results in conduction of transistors 13 and 18 and readout of the bit contained on capacitor 77 to input-output 111. However, the presence or absence of a bit will not be detected since the AND 16 is enabled only at EVEN digit times, and this is time D1 which is ODD.

However, the transistor 58, FIG. 1*a*, conducts and biases transistors 60 and 62 to conduction to read out the bit representation stored on capacitor 64 onto input-output 10. Since D1 time is ODD, the AND circuit 14, FIG. 1*b*, is enabled if a bit is present. If a bit is present, the transistor 15 conducts and furnishes a signal to AND circuit 83 to bias transistor 73 to conduction. It will be noted that AND circuit 83 is enabled by the presence of a right shift signal to diode 90 by means of transistor 88.

The transistor 73, upon conduction, transfers the bit indication to input-output 11 where it is read onto capacitor 77 at the end of the ODD digit time.

While the apparatus for a left shift has not been shown, it is evident that by timing the stages from stage D9 to stage D0 and using timing pulses such that the readout time for D1 is contemporaneous with the readin time of D2 and the readout time of D2 is contemporaneous with the readin time of D3 and so on through the register, a left shift can be executed.

Another feature is the adaptability of this register for high speed shifting. For example, shifting D9 data to D1 position would be possible in one scan operation. This requires that D9 readout time be D1 readin time. It is obvious now that by controlled internal feedback through the use of flexible scanning controls, any one digit may be shifted to any other digit position in one scan of the register. This only requires making the readout time of any digit the readin time of any other digit.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A shift register including:

(a) a plurality of bistable storage devices operable to a first or a second stable state, (b) timing pulse means to set each successive bistable device in said series to one of its bistable states, (c) a first and second input-output conductor each respectively connected to alternate bistable storage devices to sense the change in state of said bistable devices, (d) output gating means connected to each input-output conductor and selectively enabled when a bistable device connected to that conductor is set by said timing pulse, (e) input gating means connected to each input-output conductor and selectively enabled to reset the bistable device previously set by a timing pulse, (f) means for connecting said output gating means to said input gating means, (g) and means for enabling said input gating means during those time periods when the bistable devices connected to that particular conductor are set by said timing pulses applied thereto, (h) whereby successive timing pulses provide a readout of data sequentially and alternately to the output gating means connected to each conductor.

2. The apparatus of claim 1 further including:

(a) means for connecting the output of the output gating means of each input-output conductor to the input gating means of the other conductor, (b) means for enabling each input gating means during each successive timing pulse, (c) means for applying each timing pulse to the immediately preceding bistable device in addition to the device to which it is normally connected, (d) whereby the change of state of a bistable device on an input-output conductor is coupled through the input gate connected to said other conductor to reset the immediately preceding bistable device with the state of said succeeding bistable device.

3. A shift register including:

(a) a plurality of capacitor storage elements for storing a charge indicative of a first or second stable state, (b) timing pulse means to sequentially apply a timing pulse to each successive storage element, (c) a first and second input-output conductor each respectively connected to alternate storage elements to complete a circuit from said timing pulse means, (d) output gating means connected to each input-output conductor and selectively enabled to complete a circuit from said timing pulse means when a storage element connected to that conductor has a pulse applied thereto, (e) input gating means connected to each input-output conductor and selectively enabled to complete a circuit through said storage element in circuit with said timing pulse means to charge the same to a state determined by said input gating means, (f) means for connecting said output gating means to said input gating means, (g) and means for enabling said input gating means during those time periods when the storage elements connected to that particular conductor are in circuit with said timing pulse means, (h) whereby successive timing pulses provide a readout of data sequentially and alternately to the output gating means connected to each conductor.

4. The apparatus of claim 3 further including:

(a) means for connecting the output of the output gating means of each input-output conductor to the input gating means of the other conductor, (b) means for enabling each input gating means during each successive timing pulse, (c) means for applying each timing pulse to the immediately preceding storage element in addition to the element to which it is normally connected, (d) whereby the change of state of a storage element on an input-output conductor is coupled through the input gate connected to said other conductor to reset the immediately preceding storage element with the state of said succeeding storage element.

References Cited by the Examiner

UNITED STATES PATENTS 3,024,444 3/1962 Barry et al. -------- 328—37 X

ARTHUR GAUSS, *Primary Examiner.*